(12) United States Patent
Rodriguez

(10) Patent No.: US 6,427,719 B1
(45) Date of Patent: Aug. 6, 2002

(54) HYDROMAGNETIC VALVE FOR TOILETS

(76) Inventor: Edmundo Simental Rodriguez, Distrito B 6, Leones N.L. C.P. 64600 (MX)

( * ) Notice: Subject to any disclaimer, the term of this patent is extended or adjusted under 35 U.S.C. 154(b) by 0 days.

(21) Appl. No.: 09/762,364
(22) PCT Filed: Nov. 8, 1998
(86) PCT No.: PCT/MX98/00039
§ 371 (c)(1), (2), (4) Date: May 30, 2001
(87) PCT Pub. No.: WO00/09822
PCT Pub. Date: Feb. 24, 2000

(51) Int. Cl.[7] .................. F16K 31/08; F16K 31/14; F16K 31/22
(52) U.S. Cl. .............. 137/410; 137/390; 137/426; 137/433; 4/415; 251/65
(58) Field of Search ................. 137/409, 410, 137/429, 430, 433, 426; 251/65; 4/366, 415; 131/390

(56) References Cited

U.S. PATENT DOCUMENTS

| | | | |
|---|---|---|---|
| 3,136,332 A | * 6/1964 | Nixon | 251/65 |
| 3,202,174 A | * 8/1965 | Rudelick | 251/65 |
| 3,233,625 A | * 2/1966 | Pase | 251/65 |
| 4,360,038 A | * 11/1982 | Trinkwalder, Jr. | 137/429 |
| 4,827,982 A | * 5/1989 | Inagaki | 251/65 |
| 4,836,239 A | * 6/1989 | Kinkead | 137/429 |
| 4,865,073 A | * 9/1989 | Kocher | 137/429 |
| 5,176,167 A | * 1/1993 | Tiao | 137/430 |
| 5,638,866 A | * 6/1997 | Mueller | 251/65 |

* cited by examiner

Primary Examiner—George L. Walton
(74) Attorney, Agent, or Firm—Maria Erlinda Sarno; Carmon Pili Curtis

(57) ABSTRACT

Hydromagnetic Toilet Valve, constituted by a body, a magnet cluster, an assembly consisting of shaft with a closing gasket and a floater to open and close the valve; it uses three forces: magnetic, exerted by the floater with the tank's water level and the force of the exterior line pressure; we achieve a closure that does not permit water in or out, when the closing is done, it immediately turns into an anti-syphon valve because it does not allow the liquid in the deposit to be dragged out by gravity in absence of water on the line. Upon finding vacuum the deposit indicates that water was used for a normal bowl discharge or because the liquid leaked by the drain pipe because of anomalies in the discharge system, this valve will supply only what's necessary to fill the toilet bowl and tank to do a required flush, this valve won't supply water if the knob is not actuated to open the valve, or the lever to perform the same function.

14 Claims, 5 Drawing Sheets

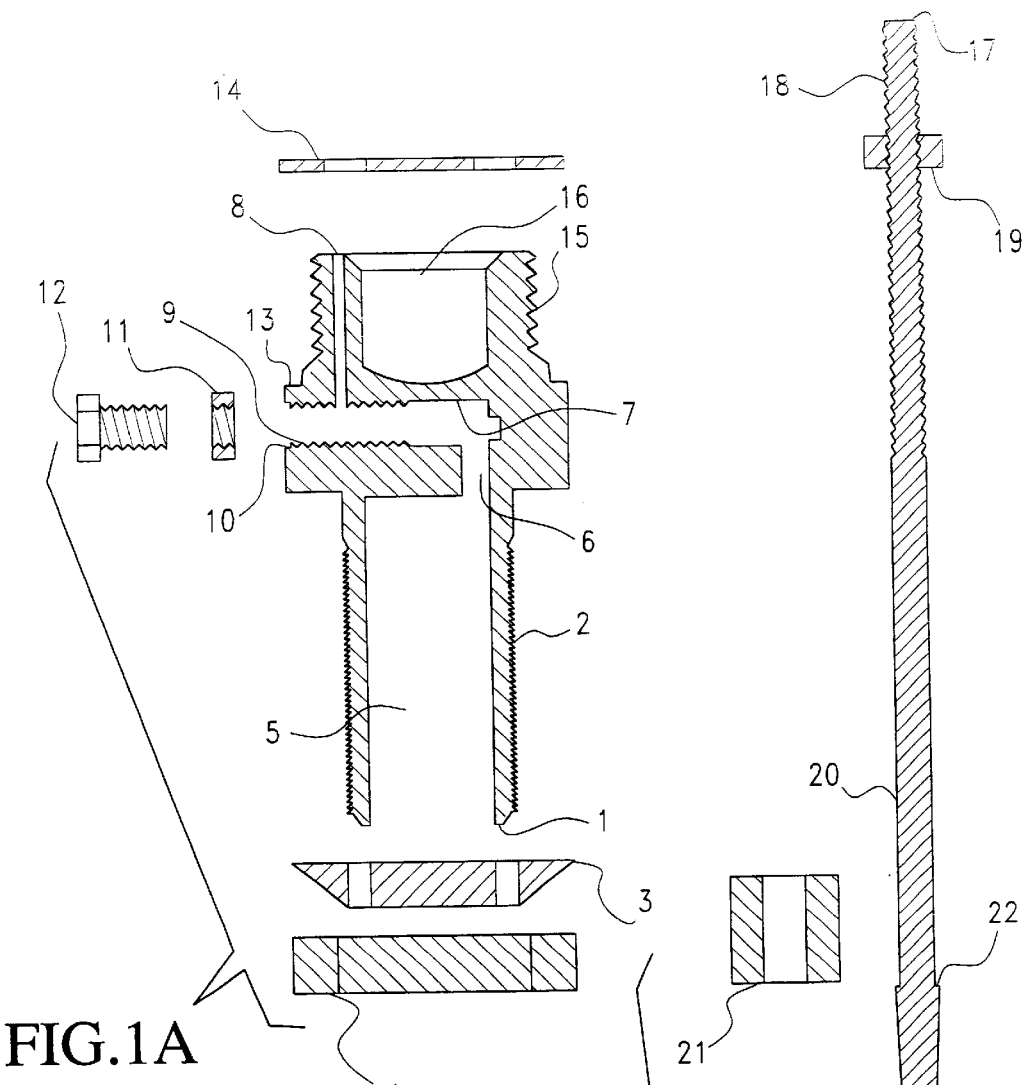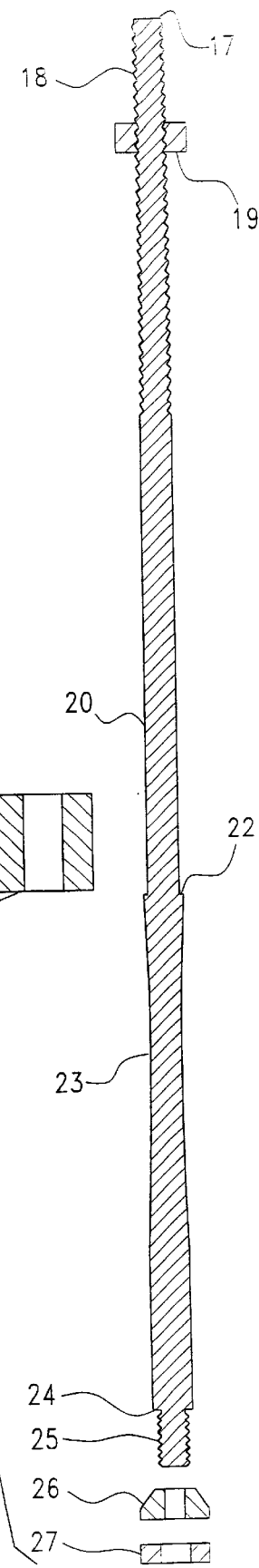

HYDROMAGNETIC VALVE FOR TOILETS

TECHNICAL FIELD TO WHICH THIS INVENTION REFERS

Figure 1:
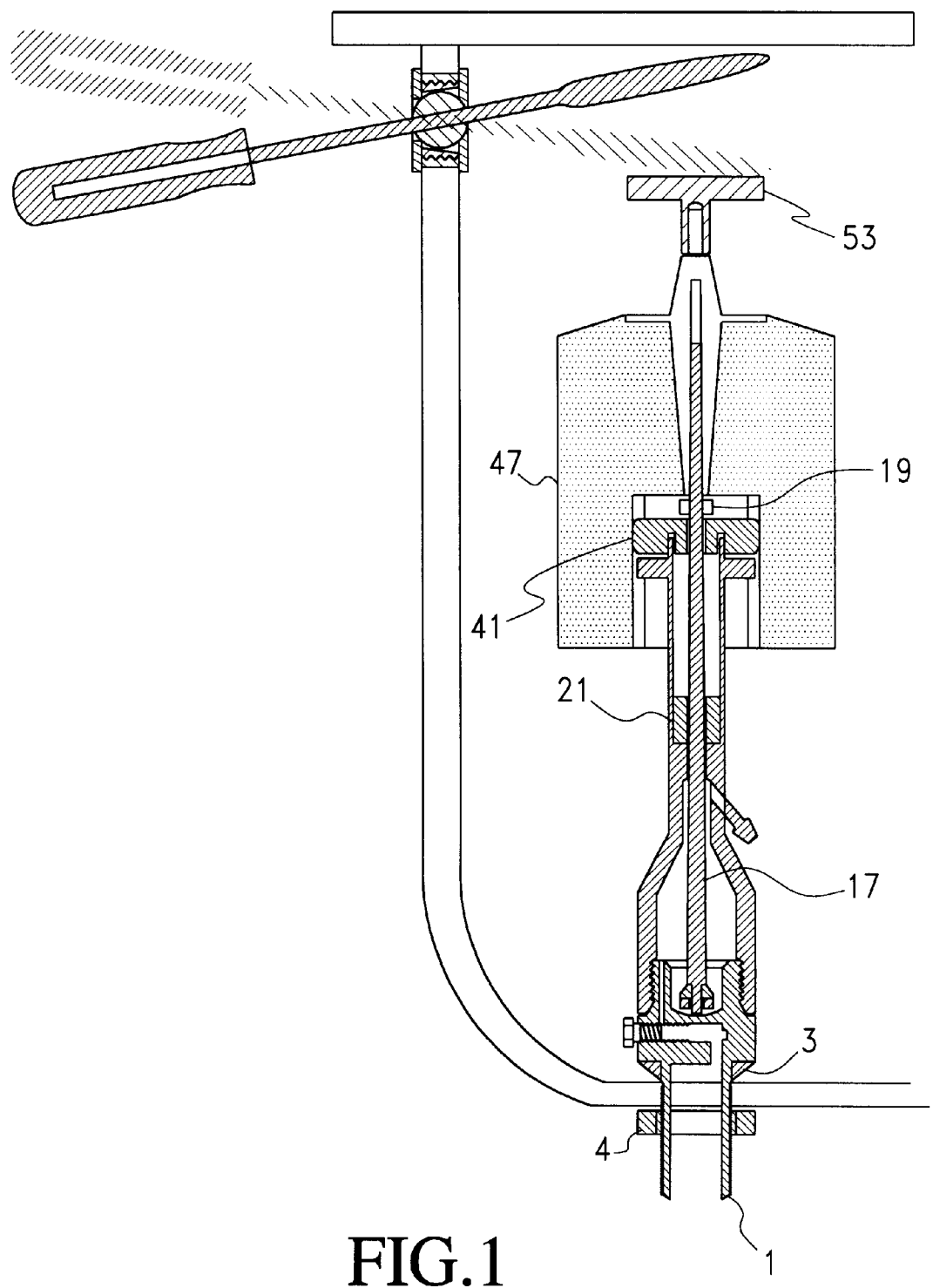

This invention is related with the toilet tank valves that fill said tank.

KNOWN PREDECESSORS OF THE STATE FOR THIS TECHNIQUE

We have the common horizontal shaft and floating element that shut out the water flow by leveraging and pushing the sealer against water pressure with the opposite extreme of the floater and shaft, this cannot be accomplished in zones where water pressure is high.

These valves, at any time are replenishing water whenever the deposit level diminishes, which in itself is good, what is not correct is the replenishment of water that has not been used to flush the tank, I say this based on the following: if the cone used to close the discharge hole is old, warped, twisted, or it simply has any kind of debris between itself and the discharge port, no matter how small the orifice is, water will be escaping there and it will be continuously replenished, the owner wil hardly notice, it is a silent leak.

DESCRIBING THE TECHNICAL PROBLEM, RESOLVING IT AND ADVANTAGEOUS EFFECTS

The main technical problem is the mechanics of current valve operation, they are always replenishing water that goes unused through the discharge port, mainly due to the sealing cone being old, warped, hardened, or simply because of debris caught between it and the discharge port where it should seat and seal.

SOLUTIONS

This can be avoided by installing a magnetic seal valve which will provide enough water for a tank including the outer part. This valve employs three forces, water pressure that pushes the shaft that has the sealing joint, the force exerted by water volume inside the tank to lift the floating element, and the strength of the magnet that attracts the magnetic bushing to the top section of the valve and shuts down water flow not allowing any water input or output.

ADVANTAGEOUS EFFECTS

We eliminate the loss of water caused by common valves because using these three forces for valve closing as detailed in the preceding paragraph, the valve will supply only the necessary water for a discharge and the cup area. Automatically when closing, it turns into an anti-syphoon, not allowing the return of water by gravity from the deposit to the street in the abscence of it on the piping.

DIFFERENCES OF THIS INVENTION TO SIMILAR INVENTIONS

Main difference is a magnetic latch that as long as it is not activated by the knob or lever to lower the floating element and components, will not attempt to replenish water level onto the tank. Another difference is that this valve closes in a down to up motion, not up to down as the other floater and shaft valves, additionally it employs three forces for closing:

First: The water pressure force that pushes the gasket upwards.

Second: The force exerted by the floater element because of the water volume in the tank that pushes the shaft that has the gasket.

Third: And finally the magnet's force that attracts the magnetic bushing located in the shaft, and that has the gasket for its final closing, keeping it fixed to the discharge port until the valve is activated (flush) to provide water, the bushing or magnetic piston self cleans by means of its up and down motion, the rubber gasket is kept clean by the water pressure.

INVENTION BRIEFLY DESCRIBED

In FIG. 1, we detail the components of this revolutionary valve. A floater (47) with a sealed section and the lower opened section, with knob (53) or an axial lever assembly to open the valve, a nut (19) to set the water level height, a magnet assembly (41) placed in the upper section of the main piece, a shaft assembly (17) inside the main piece, that supports the floater, and in its lower section a gasket and nut for closing, this shaft has a magnetic stainless steel bushing in the middle (21) for adherence to the magnet assembly, a water supply pipe (1) that also controls pressure by means of an Allen screw and a gasket, this pipe couples to the valve's main body to form a main chamber, having in its upper middle section a cavity to conceal the inferior extreme of the shaft assembly avoiding premature closure, to place this valve within the tank we use a gasket and a nut in the exterior that threads in the pipe to fix the valve to the deposit.

DESCRIPTION AND ENUMERATION OF THE DIFFERENT PARTS THAT CONSTITUTE THE DRAWINGS

FIG. 1A. Front cross-cut view of the pipe (1) showing the pressure control and the water entry point from the exterior piping.

FIG. 2. Front cross-cut view of the shaft assembly, bushing, closing gasket, pressure nut, and water level nut, which goes within the valve's main piece.

Figure 3:
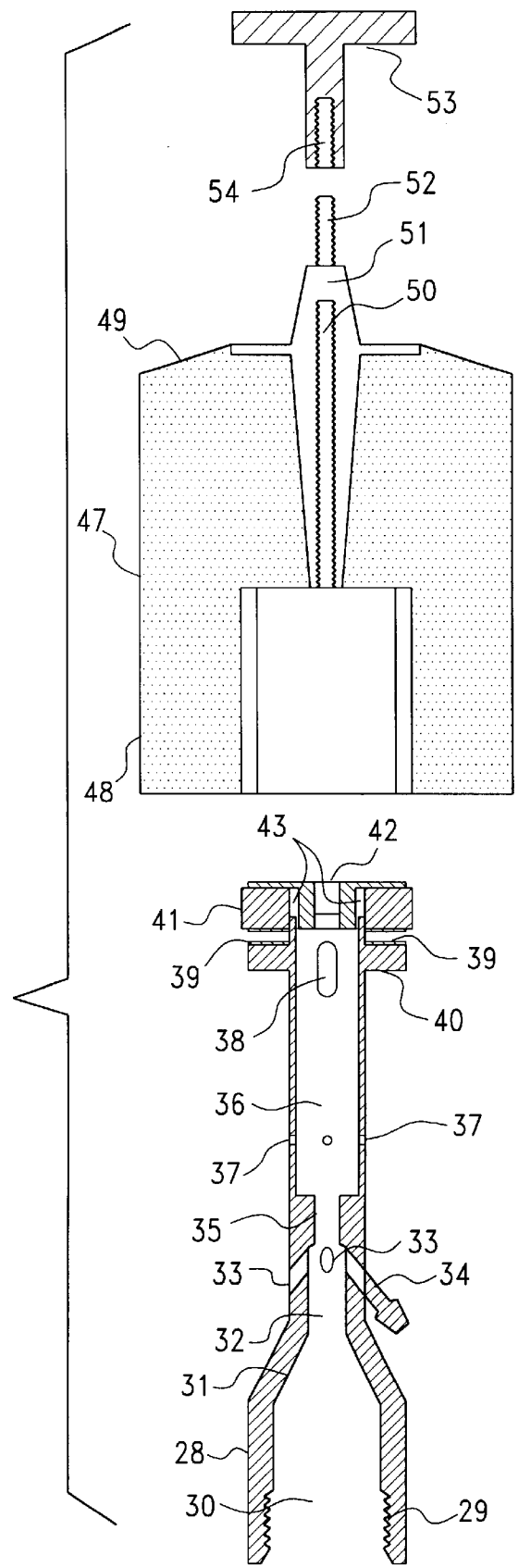

FIG. 3. Front cross-cut view that shows the main piece, the magnet assembly, the floater and the knob that opens the system.

Figure 4:
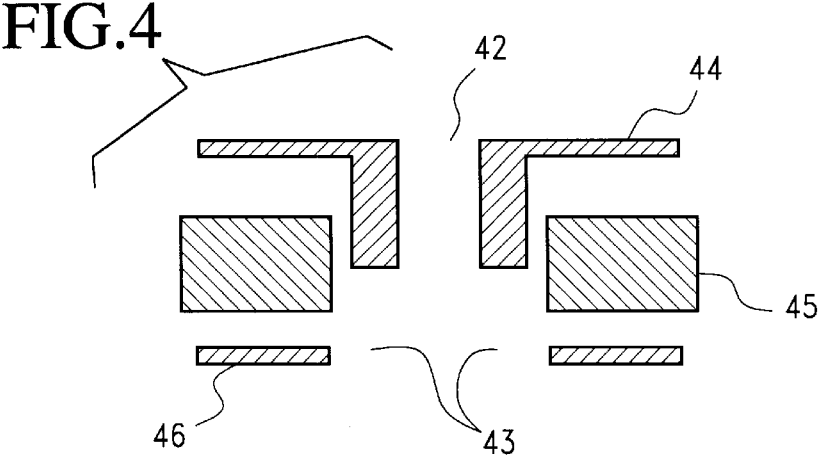

FIG. 4. Front cross-cut view of the dismembered magnet assembly.

Figure 5:
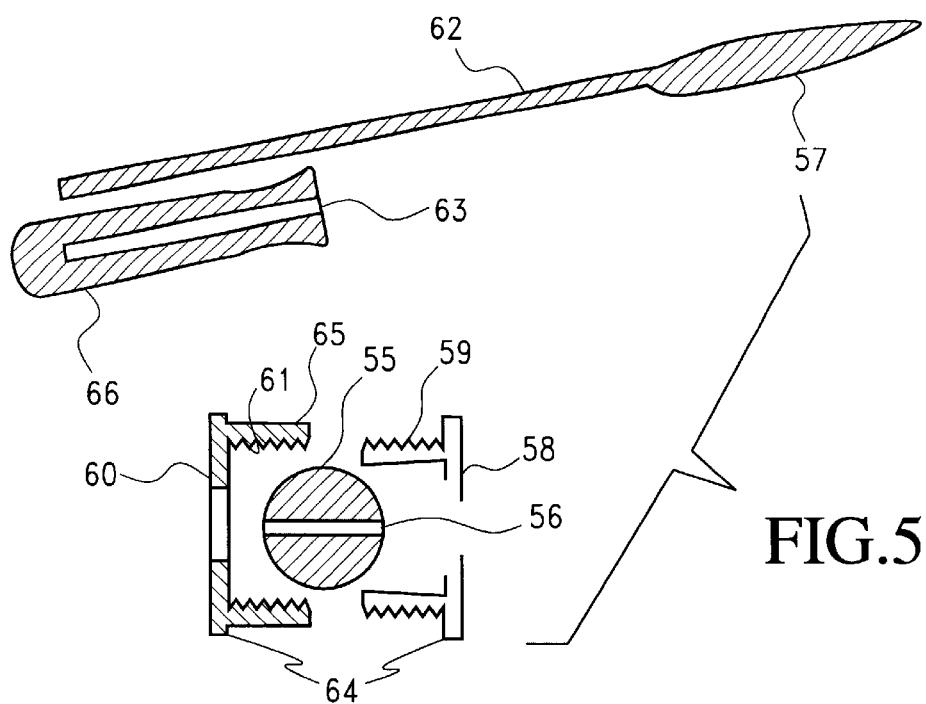

FIG. 5. Front cross-cut view that shows the disassembled lever with its axial movement system.

Figure 6:
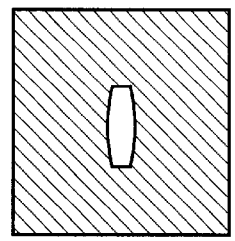

FIG. 6. Front cross-cut view of the nut making reference to the ellipse shaped hole for the lever's axial movement.

Figure 7:
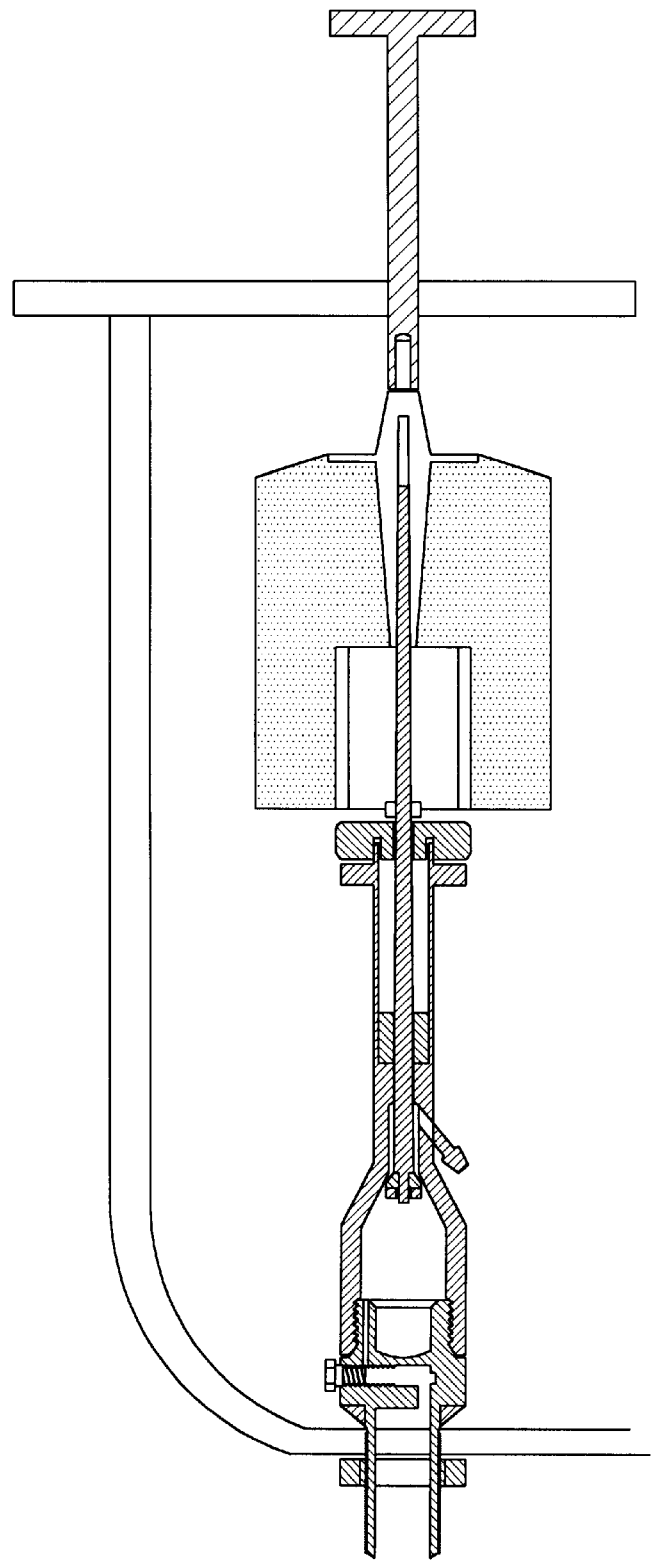

FIG. 7. Front cross-cut view of the valve installed in a knob actuated conventional tank (closed position).

With reference to said figures, this valve is formed by a combination of: a water direct access pipe (1) (FIG. 1A), hereinafter also referred to as pipe, that receives and controls water pressure, this piece has in its bottom section (2), a thread by which the rubber gasket (3) is introduced, that fits within the w.c.'s tank (67), also referred to herein as tank or deposit, a nut (4) that threads to affix the valve to the tank, an orifice (5) from where the tank receives water from the outer line, the orifice grows smaller (6) and stops with a wall (7) that decreases power from the water pressure, continuing the trip to the left and then upwards through a reduced conduit (8) to deposit water in the main chamber (30) that will be described later, this pipe (1) in continuation of the conduit (6) has a thread (9) where the adjusting screw (12) travels and at the end of the thread towards the exterior it has a box (10) where the rubber gasket (11) sits and is compressed to prevent any leaks that will be described later, this pipe (1) in the continuation of the conduit (6) has a thread (9) where the adjusting screw travels and at the end of the thread towards the exterior it has a box (10) where the rubber gasket sits and is compressed (11) so as to not allow any leaks The adjusting Allen screw (12) is dimensioned in such a way that when its end arrives at the conduit's (8) beginning when the screw is tightened to a point where the first line of the thread appears, it reduces water pressure, and if screwed in further, it can also perform a complete lateral closure.

Continuing with the pipe's (1) description at the exterior top part after the conduit (7), there is a seat (13) where the plain cylindric rubber gasket (14) goes to seal the pipe (1) with the main piece (28). When the cone shaped thread (15) at the top end of the pipeline (1) couples with the main piece (28) it forms the chamber 30 that receives water At the center is a cylindrical cavity (16) to conceal the bottom end of the shaft which contains the water flow closure gasket (26) and the pressure nut (27) so the shaft won't be pushed upwards by the water pressure and close before its time.

Description of the shaft (17) (FIG. 2) shows an assembly of 5 pieces that go within the main piece (with the exception of the floating element). The shaft as shown in FIG. 1 has a top end and a bottom end and runs along vertically within the main piece (28) and through the center of the valve. It travels upwards to close the water flow and downwards to open and let the water in. This shaft (17) is made of stainless steel of the austenitic non magnetic type so it can pass freely through the magnet's orifice (which will be later described). In the top end it has a threaded section (18) where the floater will be placed (later described) and the nut (19) underneath sets the required water level. Continuing down the shaft is a cylindrical piece that increases diameter having a small section (20) where a bushing (21) will be placed (later described). The diameter of the shaft increases to this point to form a stop for the bushing to be fixed, then continues downward reducing in diameter to form a small waist-like form (23) that will allow free flow of water when filling the tank. However, towards its bottom end, it increases in diameter to form a stop for the sealing gasket 26. The bottom of the shaft ends with a small threaded section (25) to accommodate the gasket (26) and the nut (27). The gasket (26) is rubber, cone shaped by 40° and has a center hole. It threads itself in the shaft's extreme to be set in the top (24) so it won't slide upward when the shaft assembly is being pushed down to open the valve because water pressure pushes up like the magnet's force. The nut (27) is made from stainless steel with a pressure system that impedes the gasket from moving and losing its sealing function. The bushing (21) is stainless steel of the martensitic or ferrite type, it is magnetic, so it can be attracted by the magnet in the magnetic assembly (41) to perform final water closure (main objective of this invention that I intend to protect). The bushing (21) is pressure inserted at the step 22 on the shaft. The step can be electrically welded for added safety since it doesn't hinder at the shafts and bushing's low end. FIG. 3 describes the main piece (28). Its lower section has a thread (29) to couple with the pipe (1), and form the chamber (30) where it receives water from the conduit (8) of the pipe (1), the chamber (30) continues upward forming a cone (31) about 40° in angle that serves as a seat for the gasket (26) to perform valve closure when the tank or deposit is filled with the desired amount of water. Continuing from the cone upwards it forms a small chamber (32) which will provide water to the four slanted orifices (33) to fill the toilet's deposit. One of these orifices has a small tube (34) with a protruding edge, almost in the extreme where the hose transports water from the valve to the toilet bowl by means of which the excess drain pipe (34) couples. At the top of chamber 32, the diameter is reduced to serve as a guide (35) for the shaft (17). Moving upwards, the cylinder diameter increases (36) to serve as a tract for the bushing (21) to go to the top end of the main piece (28). There are four horizontal orifices (37) that serve as a relief to evacuate water dragged by the bushing so as not to have counterpressure that will impair functionality. Near the top end of the cylinder is a small window (38) elliptical in shape that serves as a relief (same as the orifices (37)). At the top end of the cylinder is a protrusion (39) like a bushing, and a circular shelf-top (40), where the magnet assembly (41) inserts and rests. The magnet assembly has a hole (42) in the middle where the shaft (17) travels. It has a cavity (43) for the protrusion (39) to enter as shown in FIGS. 3 and 4. FIG. 4 shows the disassembled magnet cluster that is formed by a liner, a piece of iron and a magnetic disk, the three together exerting the magnet's force. The circular piece (44) is shaped like a pop-nail whose bead is perforated at the middle where the piece (17) passes. The circular piece (45) is a magnetic disk with a hole in the middle that receives the piece (44). Piece (46) is a circular magnetic liner with a hole in its center and it is adhered to piece (45) which in turn is stuck to piece (44). It is a magnet assembly like those found in radio or TV set loudspeakers. It is noteworthy that pieces (44) and (46) must be nickel-plated to protect them from rust. FIG. 3 describes the floater (47). It is a single piece made of two sections, the bottom section has a hollow cylinder shape (48), a lower opened section, so when the floater goes down, usually by pressing a top knob, the valve's main piece (28) fits inside the hollow bottom section and allows for the lower water level. The other section is at the upper part that is a totally sealed section (49) to help the floater gain strength. In its upper section, it has on the middle, a threaded orifice (50) to couple the shaft (17). The upper section has a reinforcement (51) on the wall that surrounds this orifice to let the floater have more consistency. The shaft finally ends with a small threaded top in its upper part to the middle (52) to place the knob (53) which has a threaded orifice (54) in its lower section for coupling. This knob must be of a size big enough to be used to lower the floater and open the valve directly from the tank's exterior as shown in FIG. 7. The valve is opened by pushing the knob. It can also be very small and be pushed by the lever to perform the system opening function. When the knob (53) is pushed down, the valve opens to let the water go in the tank and not out because the magnetic assembly (41) gets apart from the bushing (21).

FIG. 5 shows the lever assembly with axial motion joint. The lever assembly is the part responsible for pushing the knob (53), if not directly pushed by the user, to drive the bushing down separating it from the magnet assembly so the water can come in the tank and replenish the water in the tank. This lever is usually placed in the left side of the tank. When the lever is pulled upward, the lever returns by means of its own weight, not needing a spring. This lever is made up of five pieces: two nuts, a sphere, a ladle, and a handle. The sphere (55) has a threaded orifice in its center (56) to thread the ladle (57) through. The nut (58) has a cone shaped thread (59) to be coupled with the thread (61) of the other nut (60). Both nuts have a center hole (58) with a seat for the sphere to couple and nut (60) has an elliptical shape orifice for its axial motion that couples to the same sphere on the opposite side. The ladle travels through the sphere's threaded orifice (56) by means of the thread (62) in this ladle and it is placed in the threaded orifice (63) located in the middle of the handle. Nut (60) has a stop (64) on its four sides to avoid it passing through the square, because its four sides forms a square. To enable assembly of this cluster, the nut (60) is introduced in the square hole of the tank by the exterior wall, then the sphere is introduced and is kept in the nut's (60) seat. Next, nut (58) is threaded in the thread (61) of the nut (60) (both nuts have the necessary length to fix one against the other and not impede the sphere's axial motion). The ladle is introduced through the interior threaded orifice (56) in the center of the sphere, and finally, having the necessary distance from the ladle to push the shaft, the handle (66) is placed.

I claim:

1. A hydromagnetic tank valve, comprising:

a combination of a water access pipe for receiving water from a source; a main piece coupling with the water source pipe; a chamber formed from the coupling of the water access pipe and the main piece, the chamber receiving water from the water access pipe to the main piece; a shaft having a top end and a bottom end running along vertically within the main piece through the valve; a floater having at a bottom section, a hollow cylindrical section to accommodate the main piece when the floater is pushed down, a totally sealed upper section having a threaded orifice to couple with the shaft and a small threaded top for accommodating a knob for pushing the floater down and consequently open the valve; a nut on an upper section of the shaft to set a required water level for the tank; a movable magnetic bushing having a tract between the main piece and the shaft for movement towards and away from a magnet assembly resting on a shelf top of the main piece, the magnetic bushing moving towards the magnet assembly when the water level reaches the nut setting the required level of water thereby closing the valve to stop the flow of water to the tank and away from the magnetic assembly when the knob pushes the floater down to open the valve thereby allowing water to flow to the tank; means for attaching the water access pipe to the tank; means for controlling the water pressure to the tank; means for stabling the shaft and preventing premature closing of the valve; means for closing the valve; and, means for evacuating water dragged by the bushing to prevent counter pressure when the bushing is moved to the magnet assembly by the water pressure exerted by the water level reaching the nut setting the required level of water in the tank.

2. The hydromagnetic tank valve of claim 1 wherein the water access pipe attaches to the tank by a nut and gasket assembly.

3. The hydromagnetic tank valve of claim 1 wherein the water pressure into the tank is controlled by reducing the water access pipe orifice and putting a wall and a conduit along the water path, the conduit having an adjusting screw to further restrict the conduit opening or perform a complete lateral closure by closing the conduit.

4. The hydromagnetic tank valve of claim 1 wherein the shaft is stabilized and premature closing of the valve is prevented by attaching at the bottom end of the shaft, a water closure gasket and a pressure nut and concealing this bottom end of the shaft.

5. The hydromagnetic tank valve of claim 4 wherein the pressure nut is made of stainless steel with a pressure system that impedes the gasket from losing its sealing function.

6. The hydromagnetic tank valve of claim 1 wherein the shaft is made of stainless steel of the austenitic non magnetic-type.

7. The hydromagnetic tank valve of claim 1 wherein the bushing is magnetic stainless steel of the martensitic or ferrite.

8. The hydromagnetic tank valve of claim 1 wherein the valve is closed by forming a cone on a top end of the chamber, the cone having a dimension to form a seal with a water closure gasket on the bottom end of the shaft.

9. The hydromagnetic tank valve of claim 1 wherein the water dragged by the bushing is evacuated by orifices along the tract of the magnetic bushing.

10. The hydromagnetic tank valve of claim 1 wherein the chamber has orifices and a small tube with a protruding edge for transporting water from the chamber to the tank.

11. The hydromagnetic tank valve of claim 1 wherein the magnetic assembly comprises a magnetic liner, a piece of iron, and a magnetic disk.

12. The hydromagnetic tank valve of claim 11 wherein the piece of iron is circular, shaped like a pop-nail having a perforation at a middle section and the magnetic disk having a hole at a middle section, both perforation and hole allowing the shaft to pass through.

13. The hydromagnetic tank valve of claim 1 further comprising a lever assembly with an axial motion joint for pushing the knob to open the valve and means for attaching the lever assembly to the tank.

14. The hydromagnetic tank valve of claim 13 wherein the lever assembly comprises a nut coupling to another nut, seating a sphere in between the two nuts to impede the sphere's axial motion, the sphere having a central threaded orifice to thread a ladle therethrough, and a handle placed on one end of the ladle.

\* \* \* \* \*